(No Model.)
M. N. WARD.
BEE HIVE.
No. 334,914.   Patented Jan. 26, 1886.
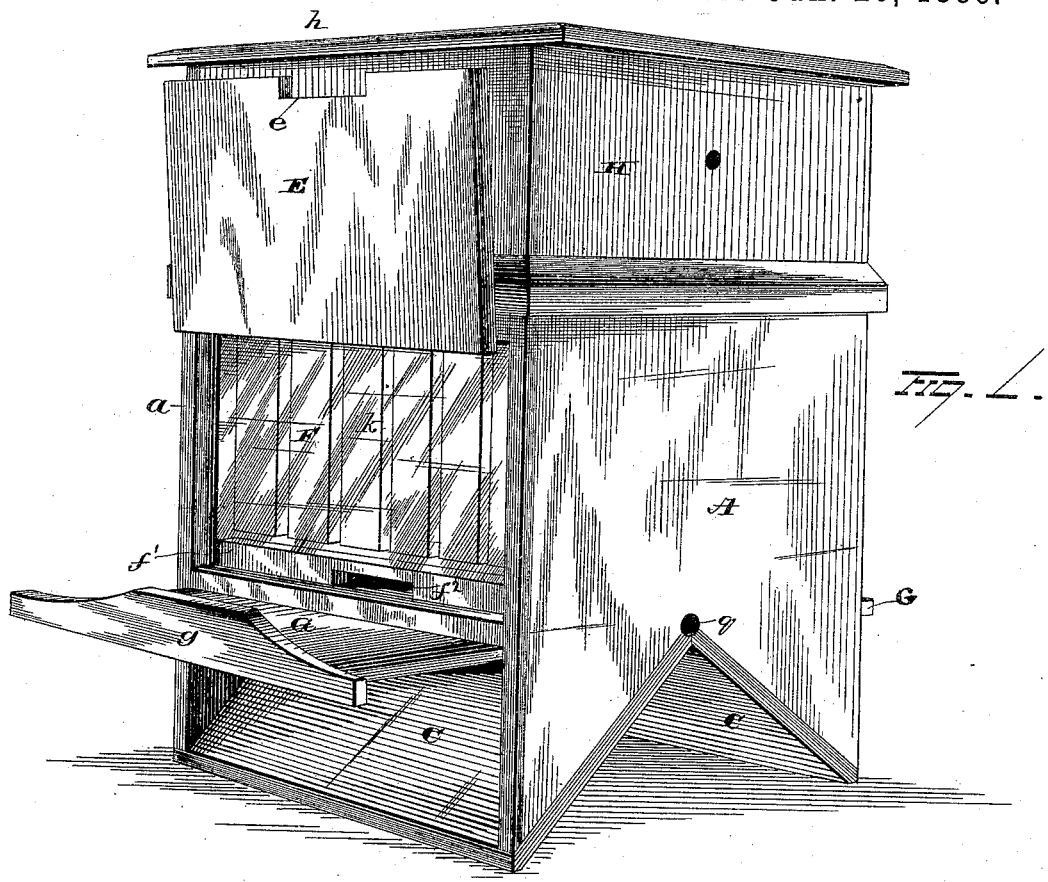
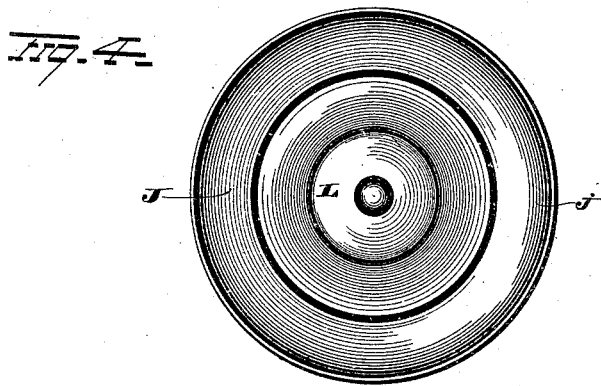
WITNESSES
INVENTOR
Moses N. Ward
Attorney (No Model.)  2 Sheets—Sheet 2.
M. N. WARD.
BEE HIVE.
No. 334,914. Patented Jan. 26, 1886.
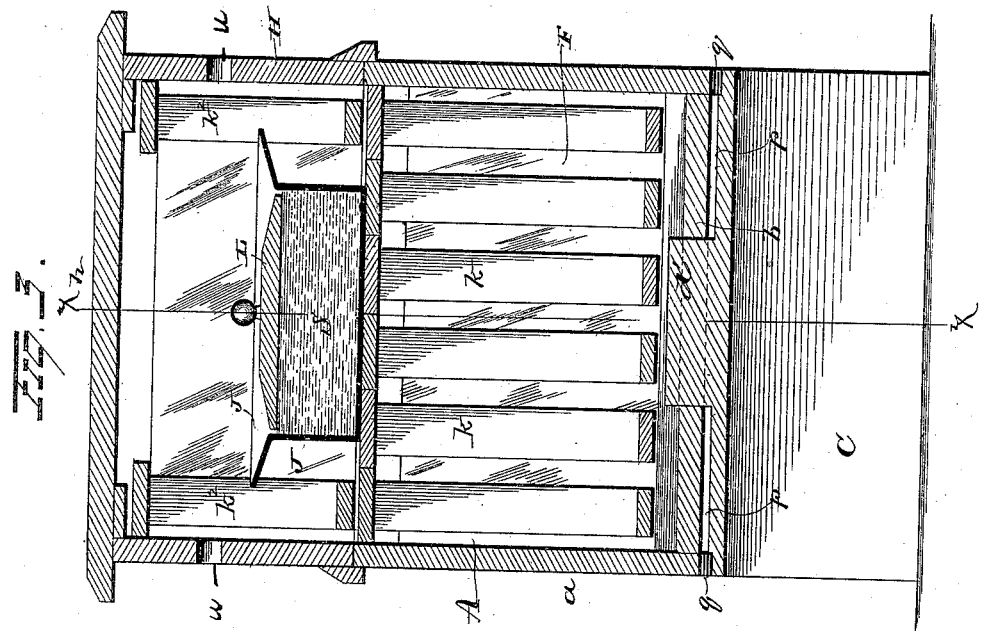
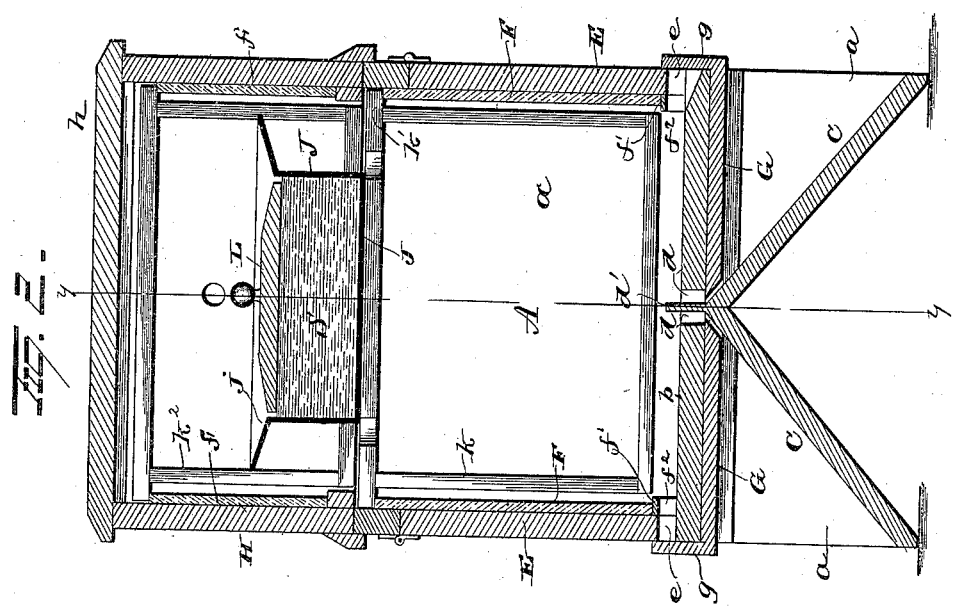
WITNESSES
INVENTOR
Moses N. Ward.
Attorney

UNITED STATES PATENT OFFICE.

MOSES N. WARD, OF VICKSBURG, MICHIGAN, ASSIGNOR OF ONE-HALF TO ZENAS WARD, OF SAME PLACE.

BEE-HIVE.

SPECIFICATION forming part of Letters Patent No. 334,914, dated January 26, 1886.

Application filed October 8, 1885. Serial No. 179,280. (No model.)

*To all whom it may concern:*

Be it known that I, MOSES N. WARD, of Vicksburg, in the county of Kalamazoo and State of Michigan, have invented certain new and useful Improvements in Bee-Hives; and I do hereby declare the following to be a full, clear, and exact description of the invention, such as will enable others skilled in the art to which it appertains to make and use the same.

My invention has for its objects to provide a bee-hive with means of thorough ventilation which will not be liable to obstruction, to prevent millers and ants from entering the hive, to facilitate the closing of the bee-entrances, when desired, for the purpose of protecting the swarm from cold or when moving the hive from place to place, to provide cleanly and efficient means for feeding the bees, and to secure a proper arrangement and support of the comb-frames, while permitting them to be readily inspected without disturbing the hive.

With these objects in view my invention consists in certain novel features of construction, which will be fully understood from the following particular description, in connection with the accompanying drawings, in which—

Figure 1 is a perspective of a bee-hive constructed according to my invention. Fig. 2 is a vertical section of the same on line $x\ x$ of Fig. 3. Fig. 3 is a vertical section on line $y\ y$ of Fig. 2. Fig. 4 is a plan view of the feeding-basin and float.

Referring to Figs. 1, 2, and 3, the letter A designates the main comb-chamber, the end walls, $a\ a$, of which are extended considerably below its floor $b$, and between the downwardly-extended portions of these walls are supported two inclined walls or ways, C C, which meet at their upper edges under the middle of the floor. At the center of the floor is an oblong opening, $d$, divided longitudinally by a partition, $d'$, which extends down to the tops of the inclined ways C C and darkens the openings, or, that is, prevents the light from passing through or under the openings and exposing the same. The opening $d$ is just wide enough for bees to pass easily through on both sides of the partition $d'$, and its length is only about one-third or one-fourth that of the floor. Between the lower surface of the floor $b$ and the meeting upper edges of the ways C C there are free open spaces or passages, as shown at $p\ p$ in Fig. 3, and in the end walls, $a\ a$, there are openings $q\ q$ at the ends of said passages.

As the entrance-opening $d$ has its mouth downward, there will be an upward draft through it into the comb-chamber, which will thus be well ventilated, a suitable outlet for the air being afforded by the upper openings, $u$. The passages $p\ p$ and openings $q\ q$ allow a free circulation of air back and forth beneath the comb-chamber and permit copious access of fresh air to the entrance-opening.

The special construction and arrangement of the ways C C with the passages $p\ p$ between them and the floor of the comb-chamber has in view (besides promotion of ventilation) the prevention of millers and ants from entering the hive. These insects, as is well known, are attracted by light, and when they climb the ways C C, seeking access to the comb-chamber, those on either side as they near the top see the light from the opposite direction coming through the open spaces and they crawl through said spaces, thus missing the entrance and passing down on the incline opposite to that which they ascended. Some also pass out through the openings $q\ q$.

The side walls of the comb-chamber are flaps or shutters E E, hinged at top and having in their lower edges long narrow notches, as $e$, which serve as openings to admit the bees at suitable times when the flaps are closed. The sides of the comb-chamber are also closed by glass panes F F, the upper edges of which are free and serve as supports for the comb-frames $k$, while their lower edges rest on cleats or bars $f'$, which are notched, as at $f^2$, in correspondence with the notches in the flaps and for the same purpose. When the hive is closed and the bees at work, these panes permit ready inspection of the comb-chamber on simply raising the flaps E E, without opening the hive or disturbing the bees. The glass panes being non-absorbent, and their upper edges smooth and narrow, the comb-frames are not liable to adhere to these supports on account of honey or wax left by the bees in moving about outside of the frames. The frames may also be handily adjusted and evenly spaced on the smooth hard edges of the panes, the top bars of the frames projecting, as at $k'$, beyond the end bars, so as to hang on said edges.

In the inner surfaces of the downwardly-extended portions of the end walls, $a\ a$, horizontal grooves are formed to receive the edges of slides G G. These slides extend from the meeting-tops of the ways C C to the outer edges of the end walls, $a\ a$, and, when fully inserted in their grooves their inner edges will almost close the entrances on the opposite sides of the partition $d'$ of the entrance-opening $d$. The entrances are, however, not quite closed, a narrow slit being left at each entrance for the purpose of ventilation, but too narrow to permit the bees to escape or outside robber bees or moths to enter. From the outer edge of each slide G a lip or plate, $g$, extends upward in position to close the entrance $e$ when the slide is fully inserted, and this lip also serves as a stop to regulate how far the slide may be inserted, so that a narrow ventilation-slit will be left at each lower entrance.

On top of the comb-chamber is arranged a removable cap, H, inclosed by four permanent walls, and provided with a removable lid or cover, $h$. This cap forms a feeding and surplus-honey chamber, a suitable number of small comb-frames, $k^2$, for surplus honey being hung upon the upper edges of glass plates $f\,f$, with which the side walls of this chamber are faced. The top bars of the comb-frames in the main comb-chamber form a floor for this surplus and feeding chamber, and upon this floor is located the feed-basin J, which is one of the most important features of my improvement. This feed-basin is preferably circular in form, (but the form is not important,) and provided with a projecting rim, $j$, upon which the bees may conveniently alight and crawl to the interior. Within the basin the sirup S for bee-food is placed, and upon the surface of the sirup is placed a float, L, having a diameter slightly less than the interior diameter of the basin, so that only a very narrow annular portion of the surface of the sirup between the basin-wall and the edge of the float will be exposed and accessible to bees which may alight upon the float or the rim $j$. It will be seen that the bees can get at the sirup only so fast as they eat it, and there will always be a full supply accessible for food, while at the same time the bees cannot become smeared, so as to render unclean and sticky the portions of the hive they come in contact with. Besides, the sirup will not be wasted.

I do not confine myself to the precise details of construction as illustrated in my drawings, but reserve the right to vary the different features of my improvement in any manner to facilitate the accomplishment of their stated objects without departing from the true spirit of my invention.

Having fully described my invention, what I claim as new, and desire to secure by Letters Patent, is—

1. The combination, with an elevated comb-chamber the bottom or floor of which is provided with an opening, of a partition dividing the opening into two parts and the inclined ways leading to said opening, substantially as set forth.

2. In a bee-hive, the combination, with the comb-chamber having a floor provided with a downward central opening, of the inclined ways leading directly to said opening, but separated from the floor by lateral open passages $p$ on one or both sides of said opening, substantially as described.

3. The combination, in a bee-hive, of the elevated comb-chamber having the bottom opening, the inclined ways leading to said opening, the flaps or shutters with bottom entrance openings and the slides provided at their outer edges with the upwardly-projecting lips or plates, substantially as described.

4. The comb-chamber having opaque hinged side walls or flaps and stationary inner transparent-glass side walls or panes with free upper edges for supporting the comb-frames, all combined and arranged substantially as described.

5. The combination, with a bee hive having an upper feeding-chamber, of a feed-basin located within said feeding-chamber and having the projecting rim $j$ and the float, the latter arranged to cover the surface of the liquid food, but of less diameter than the interior of the basin, whereby a narrow annular space is left between the sides of the basin and the edge of the float, substantially as set forth.

In testimony whereof I have signed this specification in the presence of two subscribing witnesses.

MOSES N. WARD.

Witnesses:
CHAS. A. BALDWIN,
LUCIUS V. LYON.